3,531,439
METHOD OF MANUFACTURING FLEXIBLE
FIBROUS SHEET MATERIALS
Osamu Fukushima, Kurashiki, and Katsutoshi Hosoda,
Takatsuki, Osaka-fu, Japan, assignors to Kurashiki
Rayon Co., Ltd., Kurashiki, Japan
No Drawing. Continuation-in-part of application Ser. No.
485,527, Sept. 7, 1965. This application Apr. 7, 1969,
Ser. No. 814,187
Claims priority, application Japan, Sept. 25, 1964,
39/54,359
Int. Cl. C09j 5/00
U.S. Cl. 260—75                                    10 Claims

ABSTRACT OF THE DISCLOSURE

A method of making flexible fibrous sheet material which comprises forming a fibrous sheet from fibers of a blended polymeric composition without impregnating the sheet with a solution or emulsion of a polymeric material, and dissolving out from the sheet at least one of the polymeric materials constituting the fibers of blended polymeric composition.

---

This invention relates to a method of manufacturing flexible fibrous sheet materials.

This application is a continuation-in-part of our co-pending application S.N. 485,527, filed Sept. 7, 1965, now abandoned.

Fibrous sheet materials, particularly unwoven cloths, of natural, artificial, and other fibres have heretofore been limited in their application to fields such as linings, sanitary napkins and felt, and even in these uses they are not deemed adequate in qualities and properties. In order to meet the current demands satisfactorily and also to explore future possibilities, it is believed essential that they should be further improved in their qualities.

Of all the requirements for fibrous sheet materials such as unwoven cloths, bulkiness, that is, largeness of space or volume occupied by the fibrous sheet materials, is generally contradictory to the strength requirement. Bulkiness forms the basis of other essential properties of the materials such as water- and air-retaining abilities, air permeability, and moisture permeability, and also has important bearings upon the airiness, touch, and outward appearance of the products. However, it has been inevitable in the prior art but bulkiness has been possible only at the expense of the strength of resulting cloth.

In order to keep sheet materials from losing strength while allowing them to retain as much bulkiness as possible, it has been the practice in the prior art to bond together the single fibres which constitute the sheet materials. However, the sheet materials in which the single fibres are bonded together by prior-art methods have had a serious drawback, that is, loss of flexibility.

The object of the invention is to provide a method of manufacturing very tenacious and bulky and yet flexible sheet materials.

In short, the invention provides a method of making flexible fibrous sheet material which comprises forming a fibrous sheet from fibres of a blended polymeric composition without impregnating the sheet with a solution or emulsion of a polymeric material, and dissolving out from the sheet at least one of the polymeric materials constituting the fibres of blended polymeric composition.

The fibres of blended polymeric composition for use in the invention may be obtained from a mixture of two or more types of polymeric material by wet spinning, dry spinning, or melt spinning, preferably by the process last mentioned. Also, the yarns are preferably stretched after the spinning.

Typical polymeric materials useful in the invention are homopolymers or copolymers including polyolefins such as polyethylene and polypropylene, atactic or isotactic polystyrenes, alkyl- and halogen-substituted polystyrene, polyamides such as nylon-6 and nylon-66, polyesters such as polyethylene terephthalate, polymethacrylic esters such as polymethyl methacrylate, polyvinyl acetals, acetalized with various aldehydes, polyvinyl alcohols, polyvinyl halides such as polyvinyl chloride, polyacrylonitriles, polyvinylidene halides such as polyvinylidene chloride, copolymers of condensation- or polymerization-type monomers, and graft copolymers obtained by grafting the various polymeric materials with various monomers. In selecting the two or more polymers, it is of course necessary to see that they are capable of being spun together. In this connection it must be noted that the capability of mixed spinning means that the compounds when spun into yarns have to maintain the shapes as such, as the yarns so made need not have homogeneously mixed internal structures.

From the composite filaments webs are formed. If the resulting webs are rough and too bulky and if it is desired to obtain highly tenacious end products, the webs are compacted in a suitable way.

A preferred method of compacting consists of cutting the fibre of blended polymeric composition to short staple, treating the short staple on a random webber to form a random web, and then compacting and three-dimensionalizing the random web by needle punching. If the web is not compacted sufficiently by the above procedure, it is further compressed, preferably with application of heat. For compacting purposes, it is also possible to shrink the fibres. Especially in the case where the end product is required to have good tenacity, the sheet materials is preferably subjected to shrinking in lieu of the compacting treatment by needle punching.

The sheet material compacted as above has fair strength, but the bulkiness, or the largeness of internal space or cavity possessed by the sheet material, is lost. As to flexibility, the sheet material is sufficiently compacted and deprived of the bulkiness, and may be said in that sense, to be destitute of flexibility. However, it may also be said to be flexible in that the filaments constituting the sheet material are not bonded to one another. At any rate, even if it lacks flexibility in sufficiently bulky and flexible by a subsequent step of the manufacturing process.

Following the steps above described, the sheet material is extracted with a solvent for removal of at least one of the polymeric materials constituting the fibres. In the sheet material thus obtained, the constituent filaments themselves possess numerous minute hollow portions.

Thus, the numerous fine cavities in the materials fashioned in accordance with the invention are attributed not merely to the spaces among the constituent filaments but also to the cavities in the filaments themselves. The total sum of the cavities in the filaments constituting a sheet depends on the mixing ratio of the different types of polymeric material. This will be illustrated by an example wherein one kind of polymeric material is extracted from a fibre consisting of two kinds of polymeric material.

Mixed chips prepared by mixing and kneading nylon-6 and polystyrene at different mixing ratios were extruded through nozzles having one hundred 0.2 mm.-dia. orifices each to produce filaments of different mixing ratios. The filaments were then stretched by 300 percent at 175° C. and then by 50 percent at 200° C. (to a total stretching rate of 500 percent). From the products, polystyrene was removed by extraction.

For the purpose of extraction, the products were dipped in benzene at 65° C. repeatedly until the polystyrene content was removed completely. The special hollow filament yarns obtained by the procedure described above had properties as shown in the following table.

Amount of polystyrene in mixture,

| percent | 5 | 10 | 20 | 30 | 40 | 50 | 60 | [1]80 |
|---|---|---|---|---|---|---|---|---|
| Before extraction: | | | | | | | | |
| Denier size, d | 3.0 | 3.0 | 3.0 | 3.0 | 3.1 | 3.0 | 3.0 | |
| Tenacity, g./d | 7.8 | 7.6 | 7.2 | 6.5 | 6.0 | 5.8 | 5.2 | |
| Elongation, percent | 2.1 | 2.3 | 1.9 | 2.3 | 2.4 | 2.3 | 2.2 | |
| After extraction: | | | | | | | | |
| Denier size, d | 2.9 | 2.9 | 2.9 | 2.4 | 1.9 | 1.5 | 1.2 | |
| Tenacity, g./d | 7.2 | 7.5 | 7.0 | 6.7 | 6.8 | 6.5 | 6.9 | |
| Elongation, percent | 2.3 | 2.4 | 2.5 | 2.1 | 2.3 | 2.5 | 2.1 | |
| Porosity, percent | 3 | 4 | 6 | 20 | 38 | 49 | 60 | |
| Cross sectional area after extraction / Cross sectional area before extraction | 1.01 | 0.99 | 1.00 | 0.98 | 0.99 | 0.97 | 0.98 | |

[1] Extraction destroyed the fibrous state of product.

In the above table the porosity indicates values of $$\left(1-\frac{C}{D}\right)\times 100$$

where

C is denier of the fibre after extraction,
D is denier of a fibre of the insoluble component only having the same sectional area as that of the former.

The sheet materials produced in accordance with the invention are formed of the fibres which themselves have a porosity of up to about 70 percent.

It is essential that the solvent for dissolving at least one of the polymeric materials constituting the fibres of blended polymeric composition of the invention can be a solvent for at least one of the polymeric materials (extractable content) which constitutes the fibre of blended polymeric material(s) (nonextractable consituents). While the type of solvent to be employed depends on the type of fibre of blended polymeric composition, typical solvents useful in the invention include methanol solutions of calcium chloride, titanium tetrachloride, and lithium chloride, other salt solutions, organic solvents such as cyclic ether compounds, aliphatic and aromatic hydrocarbon compounds, ketone compounds, and cyclic ketone compounds, aqueous solutions of various salts, and their mixtures.

The sheet materials produced in accordance with the invention are highly tenacious, bulky, and flexible, and are not merely able to display such excellent properties fully in the ordinary uses of sheet materials but also can expand the applications into fields which have been left unexplored.

Typical applications for the sheet materials produced by the method of the invention are: linings, wall paper, felt, base cloth for artificial leather, towels, hats and caps, handkerchieves, diapers, sheetings, substitute for absorbent cotton, wrapping materials, eyeglass cleaners, applique materials, filters, electric insulating materials, building materials, plastics bases, and eye bands.

Under the invention, starch or other polymeric material which is not capable of forming fibres alone may be used as the soluble content of the intermediate product.

The present invention will be further described hereunder with reference to examples thereof, which are not limitative.

EXAMPLE 1

A mixture of 60 parts of nylon-6 and 50 parts of polystyrene was kneaded together, and extruded by a screw extruder, through a nozzle having 300 orifices, each 0.2 mm. in diameter, at a nozzle temperature of 300° C., while air was blown through a hood to the drafting portion in the vicinity of the nozzle whereby to cool said drafting portion to 120° C. The extruded filament was wound up at a rate of 600 mm. per minute.

The resulting filaments of blended polymers were cut to short staple fibres 3 cm. long, extended over a roller card and mixed up. The mixed staple fibres were combed, piled up crosswise, and then formed by a random webber into a random web. Thereafter, the random web was pressed by a hot roller at 100° C., to a highly tenacious and compact sheet form.

The sheet material thus obtained was dipped in a toluene solution to remove by extraction the polystyrene, a constituent of the fibre of blended polymers. Then, the toluene was washed away with methanol, and methanol was removed by washing the resultant with water.

These treatments afforded a highly tenacious, bulky, and flexible sheet material.

EXAMPLE 2

Mixed chips consisting of 55 parts of polyethylene terephthalate and 45 parts of polystyrene were fed into an extruder having a 40 mm.-dia. screw, and extruded through a nozzle having 100 holes, each 0.25 mm. in diameter, and the extrusion was reeled up at a rate of 500 meters per minute. The molten polymer stream was cooled by cold air supplied to said stream through a hood provided below said nozzle.

The filaments of blended polymers were cut to short staple fibres of 2.5 cm. long, and the short staple fibres were extended over a roller card and mixed up. The staple fibres so mixed up were combed, piled up crosswise, and formed by a random webber into a random web. Then, the web was three-dimensionalized by needle punching, and compacted by pressing with a hot roller, whereby a highly tenacious and compact sheet material was obtained.

Next, the sheet material was dipped in benzene at 60° C. and polystyrene in the fibre was almost completely removed by extraction.

The sheet material thus obtained was highly tenacious, bulky, and flexible.

EXAMPLE 3

A mixture of 55 percent of nylon-6 and 45 percent of polystyrene were charged into a screw extruder having a 40 mm.-dia. to be fused and kneaded together at 300° C., and extruded through a nozzle having one hundred 0.25 mm.-dia. holes, and the extruded filament was reeled up at a velocity of 800 m./min. Prior to the winding operation, the molten polymer stream was cooled by an air flow from a hood provided below the nozzle. The filaments were drawn four-fold at 175° C. and then 1.5-fold at 210° C., crimped, and cut to obtain staple fibres of 2.5 cm. long. The fibres were separated in water, extended over a wire gauze to a lap of uniform thickness, which was then fed in between hot rollers kept at 100° C., compressed and compacted to a sheet. The sheet was dipped in toluene at 90° C. for removal of polystyrene by extraction, when a gas-permeable, bulky and tenacious sheet material having good lusture was obtained.

What we claim is:

1. A method of making flexible fibrous sheet material which comprises forming a fibrous sheet from staple fibers form from filaments of a blended polymeric composition, the polymeric materials in said blended polymeric composition consisting of two or more polymers selected from polyolefins, polystyrenes, polyamides, polyesters, polyvinyl acetals, polyvinyl alcohols, polyvinyl halides, polyacrylonitriles, or polyvinylidene halides, and dissolving out from the sheet at least one of the polymeric materials constituting the staple fibers of blended polymeric composition.

2. A method as claimed in claim 1, wherein the fibrous sheet material is formed as a non-woven random web prior to said dissolving out at least one of said polymeric materials.

3. A method as claimed in claim 2, wherein the web is compacted by a needle-punching process.

4. A method as claimed in claim 2, wherein the web is compacted by compression.

5. A method as claimed in claim 2, wherein the web is compacted by shrinking the fibers.

6. A method as claimed in claim 1, wherein the polymeric materials in the said blended polymeric composition comprise polyamide and polystyrene and the polymeric material which is eventually dissolved out is polystyrene.

7. A method as claimed in claim 1, wherein the polymeric materials in the said blended polymeric composition comprise polyester and polystyrene and the polymeric material which is eventually dissolved out is polystyrene.

8. Flexible fibrous sheet material made by the method as claimed in claim 1.

9. Flexible fibrous sheet material made by the method as claimed in claim 6.

10. Flexible fibrous sheet material made by the method as claimed in claim 7.

References Cited

UNITED STATES PATENTS

| | | | |
|---|---|---|---|
| 3,375,209 | 3/1968 | Kemper | 260—2.5 |
| 2,940,871 | 8/1955 | Johannsen | 260—2.5 |
| 3,367,891 | 11/1968 | Ingram | 260—2.5 |
| 2,268,160 | 3/1944 | Miles | 260—2.5 |
| 2,409,704 | 10/1946 | Lyem | 156—307 X |
| 2,380,003 | 7/1945 | Whitehead | 156—307 X |
| 2,773,286 | 12/1956 | Piccard | 260—2.5 |
| 3,053,609 | 9/1962 | Miller | 156—305 X |
| 3,375,208 | 3/1968 | Daddy | 260—2.5 |

CARL D. QUARFORTH, Primary Examiner

G. SOLYST, Assistant Examiner

U.S. Cl. X.R.

156—148, 305, 306; 260—77